United States Patent [19]

Lauderslager et al.

[11] 4,088,965

[45] May 9, 1978

[54] CHARGE TRANSFER REACTION LASER WITH PREIONIZATION MEANS

[75] Inventors: James B. Lauderslager, Sierra Madre; Thomas J. Pacala, Los Angeles, both of Calif.

[73] Assignee: The United States of America as represented by the Administrator of the National Aeronautics and Space Administration, Washington, D.C.

[21] Appl. No.: 704,180

[22] Filed: Jul. 12, 1976

[51] Int. Cl.$^2$ .............................................. H01S 3/00
[52] U.S. Cl. ...................... 331/94.5 G; 331/94.5 PE; 331/94.5 P
[58] Field of Search .................. 331/94.5 G, 94.5 PE, 331/94.5 P

[56] References Cited

U.S. PATENT DOCUMENTS 3,876,958   4/1972   Parker ............................ 331/94.5 G

OTHER PUBLICATIONS

Collins et al., Appl. Phys. Lett., vol. 24, May 15, 1974, pp. 477-478.
Collins et al., Appl. Phys. Lett., vol. 25, No. 6, Sep. 15, 1974.
Ault et al., Appl. Phys. Lett., vol. 27, No. 7, Oct. 1, 1975.

*Primary Examiner*—Martin H. Edlow
*Attorney, Agent, or Firm*—Monte F. Mott; John R. Manning; Paul F. McCaul

[57] ABSTRACT

A helium-nitrogen laser is described in which energy in the visible range is emitted as a result of charge transfer reaction between helium ions and nitrogen molecules. The helium and nitrogen are present in a gas mixture at serveral atmospheres pressure, with a nitrogen partial pressure on the order of less than one percent. Prior to applying a discharge pulse to the gas mixture at the high pressure by means of a pair of main discharge electrodes, the gas mixture is preionized to prevent arcing when the discharge pulse is applied. The preionization is achieved by the application of a high voltage across a pair of secondary electrodes which are spaced apart in a direction perpendicular to the spacing direction of the main discharge electrodes and the longitudinal axis of the space in which the gas mixture is contained. Feedback, by means of a pair of appropriately spaced mirrors, is provided, to produce coherent energy pulses at a selected wavelength.

21 Claims, 3 Drawing Figures

CHARGE TRANSFER REACTION LASER WITH PREIONIZATION MEANS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to lasers and, more particularly, to lasers in which thermal energy charge transfer reactions take place.

2. Description of the Prior Art

The usefulness of lasers which operate at the visible and ultraviolet (UV) wavelengths, or ranges is well appreciated. Recently, a nitrogen ion laser pumped by charge transfer reaction, which operates in the visible range, has been described in the literature in the following listed references:

a. "Stimulated emission from charge-transfer reactions in the afterflow of an e-beam discharge into high-pressure helium-nitrogen mixtures" by C. B. Collins et al. Applied Physics Letters, Vol. 24, No. 10, May 15, 1974;

b. "A nitrogen ion laser pumped by charge transfer" by C. B. Collins et al. Applied Physics Letters Vol. 25. No. 6, Sept. 15, 1974.

c. "Scaling of the helium-nitrogen charge transfer laser" by Collins and Cunningham. Applied Physics Letters Vol. 27, No. 3, Aug. 1, 1975.

d. "Thermal modification of the kinetic sequence pumping the helium-nitrogen charge-transfer laser" by Collins et al. Applied Physics Letters Vol. 28. No. 9. May 1, 1976.

The laser described in the above listed references, hereinafter simply referred to as the Collins' laser, is one containing a mixture of helium and nitrogen. The laser is pumped by charge transfer from $He_2^+$ to $N_2^+$. When the stimulated emission takes place from $B^2\Sigma_u^+(v=0)$ state of the nitrogen ion ($N_2^+$) to its $X^2\Sigma_g^+(v=1)$ state violet light at 427.8nm is produced. When the state transition is between the (0,2) or (0,3) vibrational components of $B^2\Sigma_u^+$ and $X^2\Sigma_g^+$, light at 470.9nm or at 522.8nm is produced.

In the Collins' laser the input or pumping energy is provided by a powerful electron beam (e-beam) which represents the major and most significant disadvantage of the laser. In one reported embodiment (reference c) of the Collins' laser, each pulse of the e-beam has a voltage on the order of 1Mv, at a current of 13Kamp and is of a duration of about 20nsec. Thus, the laser input power is about 260 joules (J). Clearly, the power necessary to produce such an e-beam pulse is much higher. The best reported output power under unspecified conditions is about 2.3Mw at 15-16 nsec or about 36mJ. Thus, the need for the e-beam in the collins' laser results in an extremely inefficient laser. More importantly, the machinery, e.g., the accelerometer, needed to produce the e-beam is very large, requiring a relatively large room to be accommodated in, is very complex and very expensive. Consequently, the laser is too cumbersome and expensive for many commercial as well as scientific applications.

Another disadvantage of the Collins' laser, which is a direct result of the need for the e-beam, is the fact that the laser can only operate at He pressure, which is believed to be considerably higher than the minimum needed for efficient charge transfer reaction to take place. As is appreciated He is practically transparent to an e-beam at relatively low pressure, e.g., several atmospheres. It is for this reason that in the latest publications concerning the Collins' laser, He pressure on the order of 34 atmospheres (atm) is suggested, even though in the earlier publications He pressures of 3 atm and 7 atm are reported. Consequently, the laser structure or chamber has to be designed to withstand such high He pressure.

A need therefore exists for a laser which operates on the charge transfer reaction principles to produce emission in the visible range, as is the case in the Collins' laser, but one in which other than an e-beam is used to activate the laser.

OBJECTS AND SUMMARY OF THE INVENTION

It is a primary object of the present invention to provide a laser for producing emission at wavelengths in the visible range.

Another object of the invention is to provide a relatively simple laser operable by charge transfer reaction to provide emission at visible wavelengths.

A further object of the invention is to provide a relatively simple laser in which charge transfer reaction takes place between a rare gas and molecules of an additive gas.

Yet a further object of the invention is to provide a laser in which charge transfer reaction takes place in a mixture of a rare gas and an additive gas, where the gas mixture pressure may be significantly lower than heretofore attainable.

Still a further object is to provide a laser of the type in which charge transfer reaction between a rare gas and an additive gas takes place, without the need for an e-beam to form the ions which take part in the charge transfer reaction.

These and other objects of the invention are achieved by providing a laser in which a gas mixture, containing at least one rare gas and an appropriate additive gas, is first preionized to produce a substantially uniform glow discharge in the mixture. Thereafter, a triggering or discharge pulse of selected energy and duration is applied to produce a uniform main discharge in the mixture, which ionizes some of the rare gas present, and initiates the charge transfer reaction, so as to produce emission in the visible range. With the preionization, the charge transfer reaction may be triggered by a pulse from an appropraite source, e.g., a capacitor, appropriately charged so as to produce a pulse of desired energy and duration. Thus, the need for an e-beam, which is required in the prior art to initiate the charge transfer reaction, and which as hereinbefore explained is most disadvantageous, is completely eliminated.

The circuitry necessary to produce the preionization and to trigger the mixture to initiate the reaction is compact, relatively inexpensive and highly reliable. With the preionization technique, the laser of the present invention may be operated at relatively low pressures, e.g., less than 10 atm as well as at higher gas mixture pressure.

The novel features of the invention are set forth with particularity in the appended claims. The invention will best be understood from the following description when read in conjunction with the accompanying drawings.

DESCRIPTION OF THE PREFERRED EMBODIMENTS

The present invention will first be described in connection with a laser embodiment in which charge transfer reaction takes place at thermal energy levels between helium (He) and nitrogen ($N_2$) and in which laser emission is produced, by the (0,1) vibrational component of the $B^2\Sigma_u^+ \rightarrow X^2\Sigma_g^+$ transition of the nitrogen ions, $N_2^+$. The charge transfer reaction between $He_2^+$ and $N_2$ may be symbolically represented by the following sequence:

$$e^{-+}HE \rightarrow He^+ + 2e^- \qquad (1)$$

$$He^+ + 2He \rightarrow HE_2^+ + He \qquad (2)$$

$$HE_2^+ + N_2 \rightarrow N_2^+ (B^2\Sigma_u^+) + 2He \qquad (3)$$

The invention however is not intended to be limited to this embodiment and, as will become apparent from the following description, transistions other than from the $B^2\Sigma_u^+(v=0)$ state of $N_2^+$ to the $X^2\Sigma_g^+(v=1)$ are possible, such as to the $X^2\Sigma_g^+(v=2)$, $X^2\Sigma_g^+(v=3)$, etc. Also, the invention is not limited to one using a He–$N_2$ gas mixture. Rather, it is applicable to any laser in which charge transfer reaction can take place between ions of a gas, such as a rare gas and molecules of an additive gas.

Figure 1:
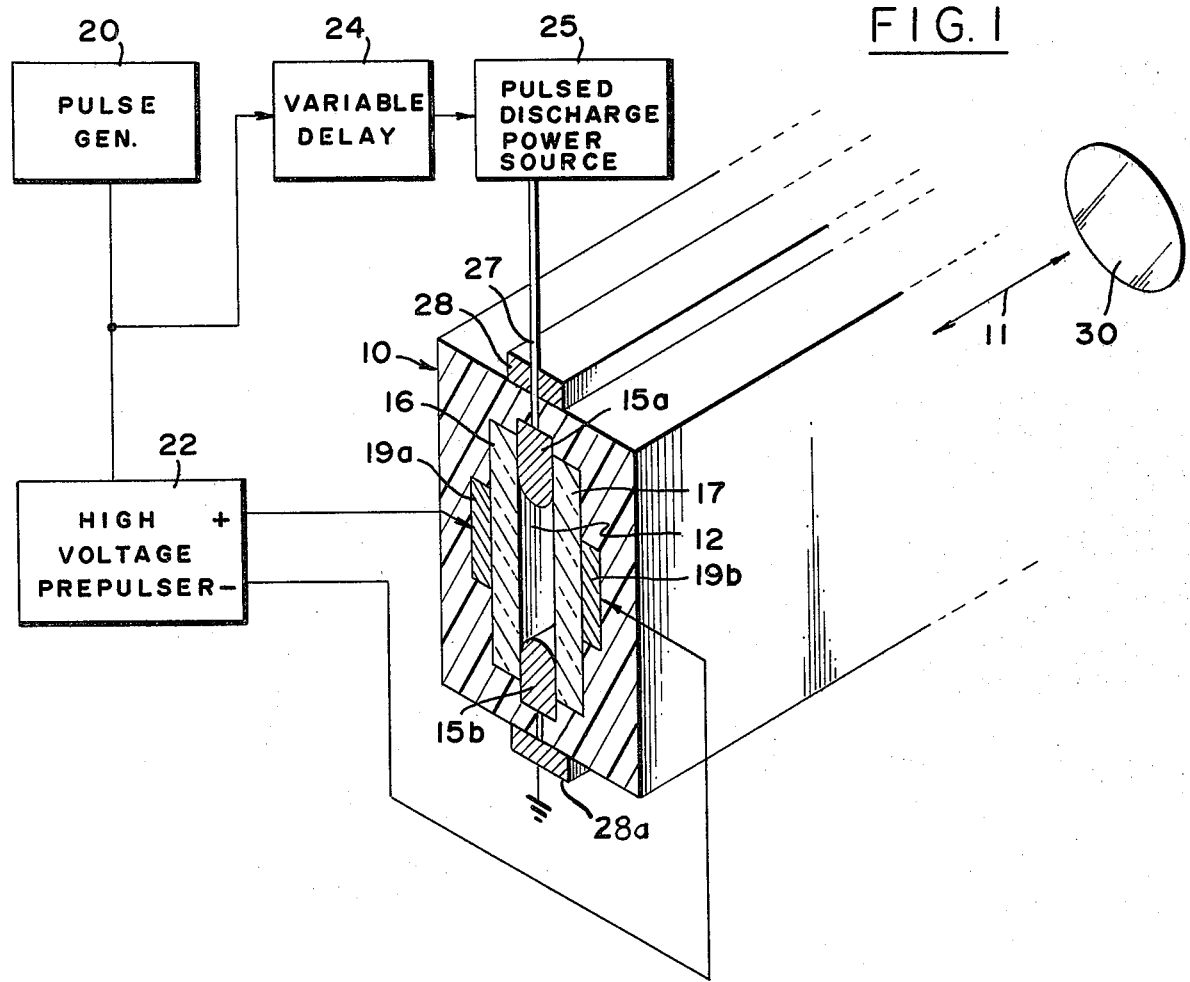
FIG. 1 is a combination block, partial isometric, and cross-sectional view of one embodiment of the invention.

Attention is now directed to FIG. 1 which is a combination block and cross-sectional diagram of one embodiment of the invention. Therein, numeral 10 designates the laser chamber in which lasing action is produced. Chamber 10, which is shown in partially isometric view and in section is an elongated rectangular, hollow chamber, extending longitudinally along axis 11. It may be made of any appropriate material capable of withstanding the pressure of the gas mixture introduced therein from an appropriate source (not shown) into the space 12. Since in accordance with the present invention the gas mixture pressure may be relatively low, e.g., <10 atm, the chamber 10 can be fabricated even from a plastic material, such as that sold under the trademark Plexiglass for thermoplastic acrylic polymer resins, or the like.

The space 12 in chamber 10 is defined by two main discharge electrodes 15a and 15b and two spaced apart insulating plates 16 and 17. The latter may be formed of glass. The space 12 is closed off at its opposite ends by quartz or glass windows (not shown). The main discharge electrodes 15a and 15b, which in one embodiment are elongated stainless steel bars, configured to prevent arcing extend the length of chamber 10. The insulating plates 16 and 17 extend colinearly with the main discharge electrodes along the chamber length. In one embodiment, actually reduced to practice, the length of chamber 10 is 64cm, the spacing between the electrodes 15a and 15b, representing the space height, is about 1.9cm, and the spacing between plates 16 and 17 is about 0.6cm for a total gas volumn of about 70cm³. In the particular embodiment the gas mixture in space 12 consisted of less than 1% $N_2$ in He at a pressure of about 3–4 atm.

In addition, in accordance with the present invention preionization electrodes 19a and 19b are included. These electrodes are positioned on the opposite sides of insulating plates 16 and 17 respectively, remote from space 12. These electrodes also extend along the chamber length. The very important function which electrodes 19a and 19b perform will be described hereinafter. However, prior thereto, the electrical circuitry to which the main discharge electrodes 15a and 15b and the electrodes 19a and 19b are connected will be described.

Briefly, the circuitry includes a pulse generator 20 which is connected to a high voltage prepulser or source 22. The positive (+) and negative (−) terminals of prepulser 22 with respect to a reference potential, e.g., ground, are connected to preionization electrodes 19a and 19b, respectively. When generator 20 provides a pulse, prepulser 22 is activated to provide a high positive voltage, e.g., +50kv to electrode 19a and simultaneously a high negative voltage, e.g., −50kv to electrode 19b. Thus, a very high voltage of 100kv, is present across the space between electrodes 19a and 19b.

The output pulse from pulse generator 20 is also applied to variable delay unit 24. The latter delays the pulse applied thereto and then applies it to a pulsed discharge power source 25. Thus, power source 25 is pulsed after prepulser 22 is activated and the high voltage is applied across electrodes 19a and 19b, by a time interval controlled by variable delay 24.

In one embodiment which was actually reduced to practice, the output of pulse power source 25 with respect to ground, when power source 25 is pulsed, is fed to electrode 15a through a multiple cable transmission line 27 and multiple connector 28. The transmission line 27 consists of a plurality, e.g., 25, shielded coaxial cables, so that when these cables are connected to electrode 5a and a discharge pulse is supplied from source 25 an equipotential gradient is produced along the electrode. The other main discharge electrode 15b is connected to ground through multiple connector 28a. The shieldings of the coaxial cables are grounded. Consequently, in effect each cable is a small capacitor which stores the charge with sufficient delay so that the equipotential distribution of charge along electrode 15a is effected. The transmission line 27 is also used to match the electrical impedance of the pulsed power source 25 to the effective impedance of the gas mixture. It should be stressed that means other than the multi-coaxial cable's transmission line may be used to couple the discharge pulse to the electrodes.

It has been recognized that in order for the charge transfer reaction to take place a reasonably large amount of He is required, at a reasonably high pressure, preferably not less than several atmospheres, e.g., $\geq 2$ atm. It has also been recognized that in order for proper charge transfer reaction to take place it is essential that the main discharge in the gas mixture, when the discharge pulse from power supply 25 is applied, be a glow rather than an arc between electrodes 15a and 15b. However, arcing cannot be prevented in the gas mixture at the relatively high pressure, unless the gas mixture is preconditioned, prior to the application of the discharge pulse from power source 25.

In accordance with the present invention the gas mixture preconditioning is achieved by the application of the high voltage, e.g., 50–100kv across electrodes 19a and 19b, just prior to the application of the main discharge pulse from power source 25. One can view the electrodes 19a and 19b as forming a capacitor so that charge or current flows between electrodes 19a and 19b, producing a sufficient number of charge carriers, i.e., electrons and ions, uniformly distributed in the gas mixture to prevent arcing of the main discharge.

One can view the preconditioning of the gas mixture, by the application of the high voltage across electrodes 19a and 19b, as preionizing the He-$N_2$ mixture. Once the mixture is preionized when the power source 25 is pulsed the discharge pulse therefrom initiates the charge transfer reaction in the mixture without arcing. That is, the reaction takes place uniformly in the volume of gas rather than be localized to a very small section of the volume.

In one embodiment the power source 25 consisted of a capacitor of 25nF charged to a voltage $v=30$kv. It was discharged by firing a thyratron by the pulse from delay 24, into a mixture of He at 3–4 atm with less than 1% $N_2$. The discharge pulse duration was on the order of 25nsec. The measured output was a light pulse at 427.8nm, i.e., in the violet range of 180kw and of a duration of about 8nsec, which in terms of joules corresponds to an output of 1.5mJ. The duration and power of the output light pulse can be increased by increasing the power of the discharge pulse. This can be achieved by increasing the capacitor size, for example to 75nF or more, and the voltage to which the capacitor is initially charged. A large capacitor has a longer discharge time and consequently, in the laser of the present invention a longer duration output light pulse may be expected. A discharge pulse from source 25 of a duration on the order of 30–50nsec or more, can easily be produced.

In the particular embodiment, which was reduced to practice, end mirrors 30, spaced apart along the laser longitudinal axis 11 about the center of space 12, were used to tune the laser to produce the $B^2\Sigma_u^+(v=0) \rightarrow X^2\Sigma_g^+(v=1)$ transition of the nitrogen ions, thereby resulting in a light pulse of 427.8nm. In FIG. 1, only the back mirror 30 is shown, while the front mirror is deleted to simplify the drawings. It should be clear that by proper selection of mirrors 30, having desired reflectivity properties, the novel laser may be tuned to produce the 0,2 and 0,3 vibrational components of the $B^2\Sigma_u^+ \rightarrow X^2\Sigma_g^+$ transitions of $N_2^+$, and thereby produce light pulses at 470.9nm and 522.8nm, i.e., blue and green, light pulses, respectively.

From the foregoing it should thus be appreciated that in the laser of the present invention the gas mixture is first preionized to produce uniformly distributed charge carriers in the gas mixture, prior to the application of the discharge pulse. Thus, when the main discharge pulse is applied arcing is prevented in the relatively high pressure mixture, and the proper charge transfer reaction takes place uniformly in the gas volume. To date it was discovered that at least for the laser, hereinbefore described, the time delay provided by delay 24 should preferably be not less than 10nsec and not more than 2μsec.

It should thus be appreciated that in the laser of the present invention a transition takes place by charge transfer reaction between $He_2^+$ and $N_2$, which is similar to that occurring in the Collins' laser. However, in the present invention the formation of the helium ions to initiate the charge transfer reaction is achieved by circuitry (means) without an e-beam. Herein, the need for an e-beam is completely eliminated. In the laser of the present invention, preionization of the gas mixture is used to precondition the mixture, so that a discharge pulse from a simple power source, such as a charged capacitor, can be used to cause the formation of the helium ions without arcing, even though the helium is at high pressure. As should be appreciated, the circuitry can be produced relatively inexpensively and housed in a very small space, whereas the equipment needed to produce the e-beam, which is required in Collins' laser, is very large, and very costly. Thus, whereas the cost of the Collins' laser would be extremely high, thereby limiting its potential use, the laser of the present invention can be produced at a modest cost, requires only a small space and, therefore, can be used in may commercial and scientific applications.

Another significant advantage of the laser of the present invention is the fact that it can operate repetitively, i.e., be pulsed at a reasonably high rate. Thus, it can be thought of as a repetitively pulsed charge transfer reaction type laser. To date, it was operated satisfactorily at a rate of at least 10 Hz. It is clear that higher pulsing rates can be used. It is believed that a high energy e-beam such as the one required in the Collins' laser cannot be fired anywhere near such a rate.

It is recognized that the desirability of preionizing a high pressure gas in lasers to prevent arcing has been known in the art. For example, transverse preionization has been used in $CO_2$ lasers. Recently transverse preionization has been described by Russian authors in the following references:

1. "Superradiance on the $2^+$ and $1^-$ bands of nitrogen in a discharge at pressures above 10 atm." by V.N. Ishchenko, et al, JETP Lett., Vol. 19, No. 7, Apr. 5, 1974, published by American Institute of Physics.

2. "The $N_2^+$ Laser" by V. N. Ishchenko et al., Optics Communication, Volume 13, number 3, March 1975.

The laser described in reference #1 is a neutral nitrogen laser in which direct electron impact takes place. As is appreciated, such a laser operates in the superradiation or superfluorescent regime and is not one with feedback, provided by two end mirrors, designed to produce a highly collimated beam of light tuned to a particular wavelength. In a laser operating in the superradiation (or superradiant) regime the excitation and inversion exist only briefly, on the order of several nsec, so that there is insufficient time for energy to travel between the two end mirrors to provide feedback. This is clearly indicated in reference #1. Since the inversion duration is so short the input pulse duration is very short. In the reference an input pulse with a rise time of 3–5nsec is suggested.

In fact, in a neutral nitrogen laser in which superradiation without feedback takes place, the output pulse is either not collimated or only partially collimated, by the use of one mirror. Thus, it is in fact not a true laser. One manufacturer of a neutral nitrogen laser type device refers to the device as a superfluorescent discharge device, rather than as a laser. However, for explanatory purposes and due to the accepted terminology in the art the superradiating neutral nitrogen laser-type device will be referred to as a laser.

In attempting to produce the neutral nitrogen laser the authors of reference #1 must have realized that it would be preferable to have the nitrogen under high pressure, e.g., 10 atm to increase the amount of nitrogen in the cavity. They added He as a buffer gas and found that it is preferable to preionize the gas mixture to facilitate the discharge by direct electron impact in the high pressure gas mixture. However, such preionization is suggested only in the context of a neutral nitrogen laser operating in the superradiant regime.

The laser, described in reference #2, although referred to as a $N_2^+$ (nitrogen ion) laser is in effect the same as the laser described in reference #1. Although the authors make reference to the transition from the $B^2\Sigma_u^+$ state of $N_2^+$ to the $X^2\Sigma_g^+$ state of the vibrational components 0,0 and 0,1 they indicate that such transitions are due to intensive superradiation and that the laser is pumped by direct electron impact rather than by a charge transfer reaction. The authors indicate that the described laser is one operated in the superradiation regime and state that, "We consider superradiation to be the regime of highly directional induced radiation without resonator." They further state in the first paragraph of reference #1 that "... the principal mechanism that produces the inversion is direct electron impact with ionization and excitation of the molecules." On page 232 of reference #2 the authors state that "The observed dependence of superradiant power on the $N_2$-He mixture pressure and the lack of delay of the super-radiant pulse with respect to the current pulse front give one grounds for considering a one-event process of electron impact to be the mechanism of producing inversion." Thus, the laser described in references #1 and #2 is one operating in the super-radiant regime and one pumped by direct electron impact.

The volumes of some of the cells, described in reference #2, are very small. The largest volume is of cell no. 3 which is on the order of 45cm³. Since the laser was operated in the superradiant regime, in which the transition time is extremely short, the durations of both the input or discharge pulse and the output pulse are extremely short. Also, in such a short time only limited input energy can be introduced. For the largest cell of 45cm³ they describe an input energy from a capacitive discharge source of 5nF, charged to 60kv, for a total energy of 9J. It was indicated that such a capacitor has a discharge time of about 3–5nsec. The output pulse had a power of 400kw at 2nsec or about 0.8mJ.

In reference #2 the preionization was merely used to precondition the high pressure gas mixture to enable its discharge. However, since superradiant operation was contemplated, in which the transition time is extremely short, the importance of providing a uniform distribution of the current carriers in the mixture was not contemplated nor discussed. Except for cell no. 3 the other described cells had very small volumes, on the order of less than 1cm³ and therefore the desirability of providing uniform distribution of charge carriers in such small volumes never arose.

It should thus be realized that the laser described in each of references #1 and #2 operates in the superradiation mode or regime. Such a laser does not include feedback, generally provided by means of a resonator, such as two separated mirrors, since the photon transit time between the mirrors is longer than the transition time which is on the order of very few nsec. Also, due to the extremely short transition time the input pulse is generally very short, typically very few nsec, since there is no point applying an input pulse which is much much longer than the transition time. Clearly, the output pulse is very short. In the references an output pulse duration of 2nsec is mentioned. Except for one cell (no. 3), described in reference #2, the other cells are of extremely small volumes, e.g., less than 1cm³. The authors described the preionization only for the purpose of facilitating a discharge in a high pressure gas mixture. They were not concerned nor did they mention the desirability of providing a substantially uniform distribution of charge carriers in a relatively large volume by means of the preionization.

Unlike the laser described in references #1 and #2, the laser of the present invention is one in which feedback is provided, such as by means of two mirrors 30 to produce coherent output radiation. The laser of the present invention is pulsed by a relatively long duration discharge pulse on the order of not less than 10nsec, e.g., 25nsec or more to produce a relatively long output pulse, e.g., on the order of 8–13nsec and longer. Thus, in the laser of the present invention the duration during which charge transfer reaction takes place is relatively long, and takes place in a reasonably large volume on the order of tens of cubic cm³. In order to optimize the relatively long reaction in the high pressure mixture it is believed that the preionization has to be performed to produce a substantially uniform distribution of charge carriers, so that when the discharge pulse is applied the reaction takes place substantially uniformly in the large gas mixture volume to thereby optimize the output energy. Otherwise, the reaction will occur in one or more localized spots in the volume which would greatly reduce the number of formed nitrogen ions, and thereby reduce the ions undergoing the state transition.

Figure 2:
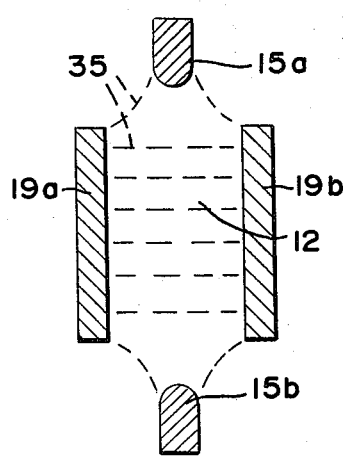
FIGS. 2 and 3 are partial diagrams useful in explaining some specific aspects of the invention.

In accordance with the present invention the main discharge electrodes 15a amd 15b are spaced from one another so that most of the charge carriers produced by the preionization i.e., by applying the high voltage across the preionizing electrodes 19a and 19b, flow between the electrodes rather than be diverted to the main discharge electrodes 15a and 15b. This aspect may best be explained in connection with FIG. 2, wherein elements like those previously described are designated by like numerals. In FIG. 2, the insulating plates 16 and 17, which in practice are located between electrodes 19a and 19b are purposely deleted.

In FIG. 2, dashed lines 35 designate the directions of flow of the charge carriers. As shown, the main electrodes 15a and 15b are preferably spaced apart so that most of the charge carriers flow between the preionization electrodes 19a and 19b, rather than to the electrodes 15a and 15b. Consequently, the charge carriers are substantially uniformly distributed in the gas mixture in space 12. Thus, when the discharge pulse is applied, the charge transfer reaction takes place substantially uniformly within the gas volume, rather than be localized at one or more spots.

Although hereinbefore the preionization of the gas mixture has been described in connection with the parallel spaced apart elongated electrodes 19a and 19b, it should be appreciated that the invention is not intended to be limited thereto. For example, spark UV preionization, in which high voltages are applied to pin-like units which have sharp edges, may be used. However, the preionization technique has to be one which is compatible with the gases in the mixture to insure that proper preionization takes place in the gas mixture at high pressure.

Figure 3:
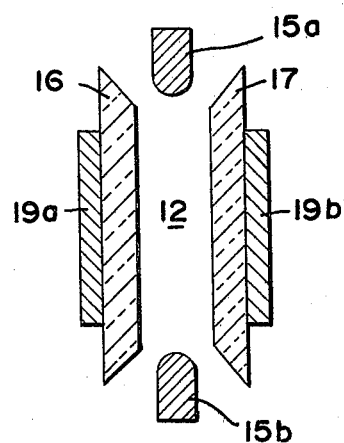

In FIG. 1 the insulating plates 16 and 17 are shown in contact with the main discharge electrodes 15a and 15b. The insulating plates 16 and 17 may be formed of glass or other dielectric material. Beveling the ends of the plates 16 and 17, as shown in FIG. 3, eliminates direct contact of the plates with the main discharge electrodes, to prevent surface currents on the glass plates going to the main electrodes 15a and 15b rather than through the gas mixture.

Although, hereinbefore the invention has been described in connection with the helium-nitrogen charge transfer reaction laser the invention is not intended to be limited thereto. The laser with the circuitry, or means, to preionize the high pressure gas mixture to provide a substantially uniform distribution of charge carriers prior to the initiation of the charge transfer reaction may be used in a laser containing any desired gas mixture in which charge transfer reaction is to take place. For example, instead of helium and nitrogen, the laser may include a mixture of neon (Ne) and nitrogen. In such a laser the charge transfer reaction steps may be represented by the following sequence:

$$e^- + Ne \rightarrow Ne^+ + 2e^-$$

$$Ne^+ + 2Ne \rightarrow Ne_2^+ + Ne$$

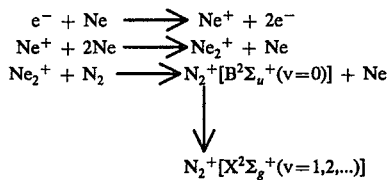

Likewise, the nitrogen in the helium-nitrogen mixture may be replaced by oxygen ($O_2$) to produce green light by the transition of the $O_2^+$ states $b^4\Sigma_g^-$ to the $a^4\pi\mu$ state. Similarly, the charge transfer reaction may take place between $He_2^+$ and CO ions ($CO^+$), which undergoes the transition between its $B^2\Sigma^+$ state, and $X^2\Sigma$, $A^2\pi_i$ to produce a light pulse at 247nm.

Another example of a laser in which the teachings of the invention may be incorporated is one in which xenon (Xe) is used as the rare gas together with nitrogen trifluoride ($NF_3$) as the additive gas. The mixture also includes a large amount of He or Ar to serve as a buffer gas. In such a laser the reaction process may be described as follows:

$$e^- + Xe \rightarrow Xe^* + e^-$$

$$Xe^* + NF_3 \rightarrow XeF^* + NF_2$$

$$XeF^* \rightarrow hv \rightarrow Xe + F \text{ (laser)}$$

The star denotes an excited state. In such a laser the output pulse is 351.1nm in the ultaviolet (UV) range.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A laser of the charge transfer reaction type comprising:
    laser resonant cavity means including a chamber, defining an internal space extending along a longitudinal axis and containing a mixture of gases at a pressure of not less than one atmosphere; and
    circuit means including;
        first means for preionizing the gas mixture in said space, said first means including means for inducing charge carriers in said gas mixture;
        second means including first electrode means for discharging a pulse of energy into the gas mixture after the first means induced charge carriers therein to thereby initiate a charge transfer reaction between different gases of said mixture; and
        third means for controlling said first electrode means to discharge energy into said gas mixture after the first means induced the charge carriers.

2. The laser as described in claim 1 wherein said circuit means include a source of pulses applied to said first and second means and delay means for delaying the application of each pulse to said second means after the application of the pulse to said first means by a preselected time interval.

3. The laser as described in claim 2 wherein said preselected time interval is in the microsecond range.

4. The laser as described in claim 2 wherein said preselected time interval is in the range of 10nsec to 2μsec.

5. The laser as described in claim 1 wherein said gas mixture is at a pressure of not less than several atmospheres and includes at least one rare gas and an additive gas of a type which is adapted to undergo a charge transfer reaction with said at least one rare gas.

6. The laser as described in claim 5 wherein the the partial pressure of said additive gas is not greater than 1 percent.

7. A laser system comprising:
    a chamber defining an internal space extending along a longitudinal axis and containing a mixture of gases, said mixture including at least two gases between which a charge transfer reaction can take place;
    first and second main discharge electrodes disposed parallel to said longitudinal axis and spaced apart from one another in a first direction perpendicular to said longitudinal axis;
    a source of a trigger pulse;
    preionization means responsive to said trigger pulse and including means for inducing charge carriers in said gas mixture;
    means responsive to said trigger pulse for applying a discharge pulse of energy to said first and second discharge electrodes a preselected interval after the inducement of charge carriers in said mixture to initiate the charge transfer reaction in said gas mixture, whereby energy is emitted from said chamber along said chamber; and
    feedback means disposed along said longitudinal axis for reflecting back to said chamber at least some of the energy emitted therefrom.

8. The laser as described in claim 7 wherein said gas mixture is at a pressure of at least several atmospheres.

9. The laser as described in claim 7 wherein the space volume is on the order of tens of cubic centimeters.

10. The laser as described in claim 7 wherein said source is adapted to provide trigger pulses at a rate of n pulses per second where $n$ is not less than 1.

11. The laser as described in claim 10 wherein n is not less than 10.

12. The laser as described in claim 7 wherein said feedback means include a pair of spaced apart mirrors with reflectivity characteristics related to energy emitted from said chamber.

13. The laser as described in claim 12 wherein said gas mixture is at a pressure of at least several atmospheres and the space volume is on the order of tens of cubic centimeters.

14. The laser as described in claim 12 wherein said source is adapted to provide trigger pulses at a rate of n pulses per second where $n$ is not less than 1.

15. The laser as described in claim 14 wherein said gas mixture is at a pressure of at least several atmospheres and the space volume is on the order of tens of cubic centimeters.

16. The laser as described in claim 12 wherein said preionization means include a pair of secondary electrodes extending parallel to said longitudinal axis and apart from one another in a second direction substantially perpendicular to said longitudinal axis and power means triggered by said trigger pulse for applying a voltage across said pair of secondary electrodes to induce charge carriers substantially uniformly in the gas mixture.

17. The laser as described in claim 16 wherein said second direction is perpendicular to said first direction.

18. The laser as described in claim 16 wherein said source is adapted to provide trigger pulses at a rate of n pulses per second where n is not less than 1.

19. A method of producing coherent energy at a selected wavelength comprising the steps of:

providing a mixture of gases at a pressure of not less than about one atmosphere in a space of preselected volume, the space defining a longitudinal axis and the gas mixture including at least two gases between which charge transfer reaction is adapted to take place so as to cause constituents of one of said gases to undergo a state transition resulting in the emission of energy including energy at said selected wavelength;

inducing charge carriers in said gas mixture substantially uniformly distributed in said space therein;

discharging a pulse of energy into said gas mixture to initiate the charge transfer reaction between said gases, said pulse of energy being discharged a preselected interval after the charge carriers are induced in said gas mixture with said charge carriers being induced so as to prevent arcing in said gas mixture when said pulse of energy is discharged therein; and feeding back to the gases in said space energy at said preselected wavelength which is emitted from said space as a result of the state transition of one of the gases which takes part in said charge transfer reaction.

20. The method as described in claim 19 wherein the volume of the gas is on the order of not less than 50 cm$^3$, and the amount of the gas undergoing said state transition in said mixture is not greater than one percent of the total mixture.

21. The method as described in claim 19 wherein said preselected time interval is substantially in the range of 10nsec to 2$\mu$sec, and the gas mixture is at a pressure of at least several atmospheres.

* * * * *

UNITED STATES PATENT AND TRADEMARK OFFICE
CERTIFICATE OF CORRECTION

PATENT NO. : 4,088,965
DATED : May 9, 1978
INVENTOR(S) : James B. Laudenslager, Thomas J. Pacala It is certified that error appears in the above-identified patent and that said Letters Patent are hereby corrected as shown below:

The patent as issued shows one of the two inventors having the name James B. Lauderslager, whereas the correct name is James B. Laudenslager.

Signed and Sealed this

Nineteenth Day of December 1978

[SEAL]

Attest:

RUTH C. MASON
Attesting Officer

DONALD W. BANNER
Commissioner of Patents and Trademarks